United States Patent [19]

Swofford

[11] Patent Number: 4,822,828

[45] Date of Patent: Apr. 18, 1989

[54] RADIATION CURABLE COATING COMPOSITION BASED ON A SILICA/VINYL-FUNCTIONAL SILANOL DISPERSION

[75] Inventor: Howard W. Swofford, Taylors, S.C.

[73] Assignee: Hoechst Celanese Corporation, Somerville, N.J.

[21] Appl. No.: 123,847

[22] Filed: Nov. 23, 1987

[51] Int. Cl.$^4$ .............................................. C08K 3/36
[52] U.S. Cl. ....................................... 522/84; 522/99
[58] Field of Search ................................. 522/84, 99

[56] References Cited

U.S. PATENT DOCUMENTS

| | | | |
|---|---|---|---|
| 3,986,997 | 10/1976 | Clark | 524/767 |
| 4,348,462 | 9/1982 | Chung | 428/412 |
| 4,455,205 | 6/1984 | Olson et al. | 522/44 |
| 4,474,857 | 10/1984 | Vaughn, Jr. | 428/446 |
| 4,482,656 | 11/1984 | Nguyen et al. | 523/340 |
| 4,491,508 | 1/1985 | Olson et al. | 522/44 |

FOREIGN PATENT DOCUMENTS 1756  1/1983  Japan ..................................... 522/99

OTHER PUBLICATIONS

Brown, Lawrence H.; Treatise on Coatings, vol. 1, Part III, "Film Forming Compositions"; Chapter 13, Silicones in Protective Coatings; 1972; p. 523.

Young, Lewis J.; "Tabulation of Q-e Values"; published in Polymer Handbook edited by Brandrup et al; 1975; pp. II-387 to II-404.

*Primary Examiner*—Lewis T. Jacobs
*Attorney, Agent, or Firm*—Gregory N. Clements

[57] ABSTRACT

A aqueous, radiation curable, coating composition is disclosed which comprises: (A) from 50 to 85 percent, based on the total weight of the dispersion, of a vinyl functional silane, (B) from 15 to 50 percent, based on the total weight of the dispersion of a multifunctional acrylate, and (C) optionally, from 1 to 3 weight percent of a photoinitiator. The vinyl-functional silane is the partial condensate of silica and a silane, such that at least sixty percent of the silane is a vinyl-functional silane conforming to the formula

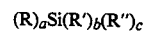

wherein
R is allyl or vinyl functional alkyl
R' is hydrolyzable alkoxy or methoxy
R" is non-hydrolyzable, saturated alkyl, phenyl, or siloxy,
such that $a+b+c=4$; and
    $a \geq 1$;
    $b \geq 1$;
    $c \geq 0$.

The above described coating composition may be applied to plastic materials and cured by exposure to ultraviolet or electron beam irradiation to form a substantially clear, abrasion resistant layer. The radiation curable composition has particular utility as an abrasion resistant coating for synthetic films, preferably polyester films. Such coated films may then be employed in automotive glazing and touch panel control applications.

8 Claims, No Drawings

RADIATION CURABLE COATING COMPOSITION BASED ON A SILICA/VINYL-FUNCTIONAL SILANOL DISPERSION

BACKGROUND OF THE INVENTION

The present invention relates to a radiation curable coating composition comprising an aqueous dispersion of silica/vinyl-functional silanol dispersion in combination with one or more multifunctional acrylate or methacrylate monomers. The present invention also relates to an abrasion-resistant synthetic film comprising a synthetic film and the cured coating composition. Finally, the present invention also relates to processes for coating the radiation curable coating composition onto synthetic films, preferably onto polyester film.

Polyester films have recently found expanded applications as transparent and translucent layers applied to solid substrates and especially to transparent substrates. Thus, such films may be applied to windows and viewing or lighting media to control the transparency thereof. Additionally, polyester films have found many varied applications as independent substrates including uses in the optical arts for display purposes and in conjunction with electronic equipment having visual or optical screens and/or overlays. Also, recently developed membrane touch switches may contain an outer layer of polyester film. An extremely important application is the automotive windshield (laminated safety glass) market.

While polyester films have many desirable physical properties for such applications, these films unfortunately lack good abrasion resistance. Prior artisans have suggested coating such films with a wide variety of scratch-resistant coatings, including coatings containing one or more polyorganosiloxane compounds.

Many of the previous proposals have involved an aqueous dispersion of silica and at least one polyorganosiloxane which is applied to a synthetic substrate, such as polyester, and then thermally cured. For example, R. Ubersax, "Coated Polymeric Substrates," U.S. Pat. No. 4,177,315 discloses an abrasion resistant coating composition comprising from about 5 to 50 weight percent solids comprising from about 10 to 70 weight percent silica and about 90 to 30 weight percent of a partially polymerized organic silanol of the general formula $RSi(OH)_3$, wherein R is selected from methyl and up to about 40% of a radical selected from the group consisting of vinyl, phenyl, gamma-glycidoxypropyl, and gamma-methacryloxypropyl, and about from 95 to 50 weight percent solvent, the solvent comprising about from 10 to 90 weight percent water and about from 90 to 10 weight percent lower aliphatic alcohol, the coating composition having a pH of greater than about 6.0 and less than about 8.0. The above described coating composition is applied to the polyester substrate and subsequently cured at a temperature of from 20° to 150° C., preferably from 100° to 150° C. Curing catalysts such as alkali-metal salts of carboxylic acids and quaternary ammonium carboxylates can be included in the coating composition. Another example is D. Olson et al, "Abrasion Resistant Silicone Coated Polycarbonate Article," U.S. Pat. No. 4,239,798 which discloses a polycarbonate substrate primed with a thermoplastic acrylic polymer which is subsequently coated with a thermoset, silica-filled, organopolysiloxane top coat. This top coat is the condensation product of a silanol of the formula $RSi(OH)_3$ in which R is selected from the group consisting of alkyl radicals of 1 to 3 carbon atoms, the vinyl radical, the 3,3,3-trifluoropropyl radical, the gamma-glycidoxypropyl radical and the gammamethacryloxypropyl radical, at least 70 weight percent of the silanol being $CH_3Si(OH)_3$.

A number of patents teach the use of an abrasion resistant coating comprising a dispersion of colloidal silica in an aliphatic alcohol/water solution of the partial condensate of an alkyltrialkyoxysilane, which must be primarily methyl trimethoxysilane. These patents typically improve upon the abrasion resistance of this coating by incorporation of an additional component. A representative example is U.S. Pat. No. 4,277,287 which teaches the inclusion of a small amount of a polysiloxane polyether compolymer. Other patents which may be included within this group are U.S. Pat. Nos. 4,474,857; 4,436,851; 4,413,088; 4,373,061; 4,368,241; 4,368,236; 4,368,235; 4,367,262; 4,298,655; and 3,986,997.

There are a few patents which teach the use of radiation curable polysiloxane-based abrasion-resistant coatings. For example, V. Cross, "Polyester Film Having Abrasion Resistant Radiation Curable Silicone Coating," U.S. Pat. No. 4,310,600 teaches a coating composition comprising a silica/silanol composition being derived from a composition comprising a dispersion of colloidal silica in a lower aliphatic alcohol-water solution of the partial condensate of a silanol of the formula $RSi(OH)_3$ in which R is selected from the group consisting of unsubstituted and inertly substituted alkyl radicals having one to three carbon atoms and unsubstituted and inertly substituted phenyl radicals, at least about 70 weight percent of said silanol being of the above formula wherein R is $CH_3$, said silica/silanol composition containing about 10 to about 70 weight percent of said colloidal silica and about 30 to about 90 weight percent of said partial condensate, based on the total solids weight; and one or more multifunctional acrylate monomers and/or oligomers; and optionally one or more photoinitiators.

Similarly, R. Chung, "Abrasion Resistant Ultraviolent Light Curable Hard Coating Compositions," U.S. Pat. No. 4,348,462 discloses a radiation curable coating composition which comprises (a) colloidal silica, (b) acryloxy or glycidoxy functional silanes, (c) non-silyl acrylates and (d) catalytic amounts of UV sensitive cationic and radical type photoinitiators. Other patents which disclose UV curable polyorganosiloxane coating compositions include U.S. Pat. Nos. 4,595,471 and 4,571,349.

BRIEF SUMMARY OF THE INVENTION

In one aspect, the present invention relates to a radiation curable coating composition comprising:

(a) from 50 to 85 percent, based on the total weight of the composition, of colloidal silica and the partial condensate of a silane, such that at least sixty percent of the silane is a vinyl-functional silane conforming to the formula

$(R)_a Si(R')_b (R'')_c$ wherein
R is allyl or vinyl-functional alkyl
R' is hydrolyzable alkoxy or phenoxy
R" is non-hydrolyzable, saturated akyl, phenyl, or siloxy such that $a+b+c=4$; and $a \geq 1$;
$b \geq 1$;
$c \geq 0$,
(b) from 15 to 50 percent, based on the total weight of the composition, of one or more multifunctional acrylate or methacrylate monomers.

In another aspect, the present invention relates to a primed synthetic film having an abrasion resistant layer over the primer layer, said abrasion resistant layer comprising the crosslinked reaction product of a radiation curable coating composition comprising:

(i) colloidal silica and the partial condensate of a silane, such that at least sixty percent of the silane is a vinyl-functional silane of the formula

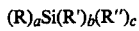

wherein
R is allyl or vinyl-functional alkyl
R' is hydrolyzable alkoxy or phenoxy
R" is non-hydrolyzable, saturated alkyl, phenyl, or siloxy such that $a+b+c=4$; and
(ii) one or more multifunctional acrylate or methacrylate monomers; and
(iii) optionally, one or more photoinitiators.

In a preferred aspect, the present invention relates to an abrasion-resistant, polyester film prepared by melt extruding a substantially amorphous polyester resin in sheet-like form and cooling said resin to produce cast polyester sheet, orienting said cast polyester sheet in one direction, thereby producing uniaxially oriented, polyester film, coating said uniaxially oriented, polyester film with an adhesion-promoting primer composition, thereby producing coated polyester film, orienting said coated polyester film in a direction perpendicular to the first direction of orientation, thereby producing biaxially oriented polyester film, heatsetting said biaxially oriented polyester film, coating said biaxially oriented polyester film with a radiation curable coating, drying said coating, and curing said coating by irradiation, with the proviso that said radiation curable coating comprises:

(i) a dispersion of colloidal silica in a lower aliphatic alcohol/water solution together with the partial condensate of a silane, such that at least 60 weight percent of the silane is a vinyl-functional silane of the formula

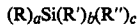

wherein
R is allyl or vinyl-functional alkyl
R' is hydrolyzable alkoxy or phenoxy
R" is non-hydrolyzable, saturated alkyl, phenyl, or siloxy such that $a+b+c=4$; and
(ii) one or more multifunctional acrylate or methacrylate monomers; and
(iii) optionally one or more photoinitiators.

In yet another aspect, the present invention relates to an automotive glazing unit comprising:
(i) a layer of glass;
(ii) a layer of polyvinylbutyral;
(iii) an abrasion resistant, synthetic film comprising a primed synthetic film having an abrasion-resistant layer over the primer layer, said abrasion resistant layer comprising the crosslinked reaction product of
(a) colloidal silica and the partial condensate of silane, such that at least 60 percent of the silane is a vinyl-functional silane of the formula

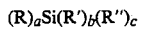

wherein
R is allyl or vinyl-functional alkyl
R' is hydrolyzable alkoxy or phenoxy
R" is non-hydrolyzable, saturated alkyl, phenyl, or siloxy such that $a+b+c=4$; and
(b) one or more multifunctional acrylate or methacrylate monomers; and
(c) optionally, one or more photoinitiators.

DETAILED DESCRIPTION OF THE INVENTION

As summarized above, the present invention relates to a radiation curable coating composition comprising an aqueous silica/vinyl-functional silanol dispersion in combination with one or more multifunctional acrylate or methacrylate monomers. The coating composition has particular utility as an abrasion-resistant coating for synthetic films, preferably polyester films.

The synthetic film employed in one embodiment of the present invention may be any flexible synthetic film. Suitable synthetic films may be prepared from polyester, polycarbonate, polyolefin and polyamide. Polyester film formed from any thermoplastic film forming polyester which is produced by condensing a dicarboxylic acid or a lower alkyl diester thereof with a glycol is preferred. Among the dicarboxylic acids and their lower alkyl diesters which may be employed to form a flexible polyester film are terephthalic; isophthalic; phthalic; 2,5-, 2,6-, and 2,7-naphthalene dicarboxylic; succinic; sebacic; adipic; azelaic; bibenzoic; the hexahydrophthalics, and bis-p-carboxy-phenoxyethane. One or more of these acids and/or their lower alkyl diesters is reacted with one of more glycols which include ethylene glycol; 1,3-propanediol; 1,4-butanediol; neopentyl glycol or 1,4-cyclohexanedimethanol. Since one or more diesters may be reacted with one or more glycols, the polyester film of this invention is not limited to homopolyesters but also includes mixed polyesters such as copolyesters.

Of the film forming polyesters within the contemplation of this invention, preferred are those containing at least a major amount of polyethylene terephthalate, the most preferred being polyethylene terephthalate homopolymer having an intrinsic viscosity, as measured in orthochlorophenol at 25° C., greater than 0.3 deciliter per gram. More preferably, the intrinsic viscosity of the polymer ranges from about 0.4 to about 1.0 deciliter per gram, again measured in orthochlorophenol at 25° C. Still more preferably, the polyethylene terephthalate employed in the present invention has an intrinsic viscosity of about 0.5 to about 0.7 deciliter per gram as measured in orthochlorophenol at 25° C.

In a preferred embodiment, the polyester polymer is melted and thereafter extruded onto a polished revolving casting drum to form a cast, flexible sheet of the polymer. Thereafter, the film is first uniaxially stretched and in a subsequent step is uniaxially stretched in a direction normal to the first stretching direction to produce a film which is biaxially oriented, that is, the film is stretched in the longitudinal and transverse directions. The film is then crystallized ("heat set"), slit, and wound into a roll.

The synthetic film is preferably treated to improve its adhesion to the abrasion-resistant layer prior to application of the abrasion-resistant coating to the surface of the synthetic film. Preferred treatment techniques include electric corona discharge treatment and the application of an adhesion-promoting primer coating. Most preferred is the sequential combination of electric corona discharge treatment of the synthetic film surface followed by application of an adhesion promoting primer coating.

Electric corona discharge treatment methods and apparatus are described in U.S. Pat. Nos. 3,057,792 and 4,239,973 the disclosures of which are each expressly incorporated by reference herein.

Adhesion promoting primers believed suitable for use in the present invention include crosslinkable acrylics, crosslinkable polyesters, and amorphous polyesters. Crosslinkable acylics are particularly preferred.

The primer coating is preferably applied to the film after it has been uniaxially stretched but prior to the second stretching operation. Most preferably, the primer coating is applied as a latex after the film has been stretched in the longitudinal direction ("machine direction") and prior to transverse stretching. The latex is preferably thermally cured to form a crosslinked adhesion promoting layer during further processing of the film (i.e. heat-setting).

One acrylic latex having particular utility as a primer coating for polyester film contains a crosslinkable methylmethacrylate/ethylacrylate/methacrylamide terpolymer having a molar ratio of about 52.5:45.5:5. The terpolymer may be present in a concentration ranging from about 0.2 percent to about 45 percent by weight, based on the total weight of the latex coating. Preferably, the terpolymer concentration range is from about 0.4 percent to about 10 percent by weight based on the total weight of the latex coating. In a more preferred embodiment of the instant invention, the terpolymer is present in a concentration of between about 1 percent and about 5 percent by weight, based on the total weight of the latex coating. The terpolymer is further characterized by a glass transition temperature in the range of about 40° C. to about 50° C. The glass transition temperature of the terpolymer is desirably in the range of between about 43° C. and 47° C., and most preferably, the glass transition temperature is about 45° C. In preferred embodiments, the latex coating includes an alkylated melamine formaldehyde cross-linking agent. Of these, hexamethoxymethyl melamine is preferred. The cross-linking agent is generally used in an amount of about 5 percent to about 30 percent, based on the weight of the total solids, and most preferably, about 15 percent to about 25 percent based on the weight of the total solids.

In general, the acrylic primer layer may be at least about 0.001 micron thick. Desirably, it is about 0.01 to about 0.5 micron thick and preferably it is about 0.01 to about 0.05 micron thick.

One or more layers of the acrylic primer coating may be applied sequentially to either one or both sides of the polyester film and the coating latex may include additional additives, as desired.

The abrasion resistant layer is produced by coating a radiation curable coating composition upon the cured acrylic primer layer, removing the solvent, and subsequently crosslinking the coating composition by ultraviolet or electron beam irradiation. As described more fully below, the radiation curable coating comprises an aqueous silica/vinyl-functional silanol dispersion in combination with one or more multifunctional acrylate or methacrylate monomers and optionally a photoinitiator.

The silica/vinyl-functional silanol dispersion comprises from 50 to 85, preferably 50 to 60, weight percent of the abrasion resistant coating. The dispersion is formed by adding a vinyl-functional silane to acidic colloidal silica.

Colloidal silica (i.e. small particles of silica suspended in water) is commercially available in both acidic and basic form. The present invention employs acidic (pH of from 3.0 to 5.0) colloidal silica rather than basic suspensions due to stability and solubility considerations. Alternatively, a basic colloidal silica may be used if the pH is subsequently adjusted to between 3.0 and 5.0 before the addition of the vinyl-functional silane.

The vinyl-functional silane is hydrolyzed to the corresponding vinyl-functional silanol when it is added to the aqueous suspension of silica. The hydrolysis of vinyltrimethoxysilane is set forth below as an illustration:

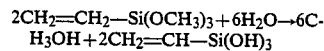

The vinyl-functional silanol then undergoes a "partial" condensation reaction (with the elimination of water) whose equilibrium is pH dependent. Only partial condensation is desired since driving the reaction to completion will result in solidification of the silanol or "gelling", as well as viscosity problems.

The addition of the vinyl-functional silane to the colloidal silica is preferably performed slowly and with gentle stirring while the silica suspension is at an elevated temperature.

The multifunctional acrylate or methacrylate monomer which forms part of the abrasion resistant coating composition comprises 15 percent to 50 percent, preferably, 15 percent to 25 percent, of the coating composition.

The specific acrylate or methacrylate monomer employed in the abrasion resistant coating is not believed critical to the present invention. Any multifunctional acrylate may be employed as long as the specific acrylate monomer selected does not create stability ("gelling") or viscosity problems. Triacrylates are preferred. Water-soluble triacrylates are even more preferred due to lower initial haze.

A non-exhaustive list of multifunctional acrylates believed useful in the present invention includes dipentaerythritolmonohydroxypentacrylate; trimethylolpropane triacrylate; pentaerythritol triacrylate; ethoxylated trimethylolpropane triacrylate; ditrimethylolpropane triacrylate; 1,3-butanediol diacrylate; diethylene glycol diacrylate; 1,6-hexanediol diacrylate; neopentyl glycol diacrylate; tetraethylene glycol diacrylate; triethylene glycol diacrylate; tetrahydrofurfural diacrylate; pentaerythritol tetra-acrylate; tripropylene glycol diacrylate; ethoxylated Bisphenol A diacrylate; and blends thereof. A highly etoxylated trimethylolpropane triacrylate, commercially avaiable from Arco Specialty Chemicals under the trademark SARTOMER C-9035, is preferred. This triacrylate is believed to conform to the following structure:

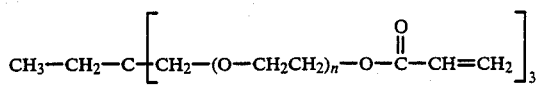

wherein n averages 5 and the degree of ethoxylation for each ethoxylated acrylate segment may be the same or different.

Another preferred acrylate is dipentaerythritol monohydroxypentacrylate, which is commercially available from Arco Specialty Chemicals under the trademark SARTOMER C-9041.

Up to 35 weight percent, preferably 15 to 25 weight percent, based on the total weight of the aqueous dispersion, of a lower aliphatic alkanol may optionally be added to enhance the stability of the silica/partial condensate dispersion. About 19 weight percent of isopropanol is preferred as the lower aliphatic alkanol.

If the radiation curable coating is to be crosslinked by electron beam irradiation, no photoinitiator is required to initiate or catalyze the reaction. If an ultraviolet radiation source will be used to crosslink the coating composition, then inclusion of a photoinitiator compound into the coating composition will be necessary. The photoinitiator, when one is employed, comprises up to 10 percent of the composition, preferably 1 to 3 percent.

A non-exhaustive list of photoinitiators believed useful in the present invention includes benzophenone, hydroxycyclohexylphenylketone, acetophenone, acenaphthenequinone, o-methoxy benzophenone, thioxanthen-9-one, xanthen-9-one, 7H-Benz(de)anthracen-7-one, dibenzosuberone, 1-naphthaldehyde, 4,4'-bis (dimethylamino) benzophenone, fluorene-9-one, 1'-acetonaphthane anthraquinone, 1-indanone, 2-tertbutyl anthraquinone, valerophenone, hexanophenone, 3-phenylbutyrophenone, p-morpholinopropiophenone, 4-morpholinobenzophenone, p-diacetyl-benzene, 4-amino-benzophenone, 4'-methoxyacetophenone, benzaldehyde, 9-acetylphenanthrene, 2-acetylphenanthrone, 10-thioxanthenone, 3-acetylphenanthrene, 3-acetylindole, 1,3,5-triacetylbenzene and the like, including blends thereof. A 50/50 weight percent blend of benzophenone and 1-hydroxycyclohexylphenylketone is preferred.

As stated above, the present invention employs a specific organosilane in its radiation curable coating composition. More particularly, the Applicant has discovered that radiation curable silica/organopolysiloxane coating compositions which employ vinyl-functional silanes as the major or primary organosilane possess superior abrasion resistance than coating compositions which employ methyltrimethoxysilane as the primary organosilane.

The vinyl-functional silanes which are believed operable in the present invention conform to the formula

wherein
R is allyl or vinyl-functional alkyl
R' is hydrolyzable alkoxy or phenoxy
R" is non-hydrolyzable, saturated alkyl, phenyl, or siloxy such that $a+b+c=4$: and
$a \geq 1$;
$b \geq 1$;
$c \geq 0$.

By "hydrolyzable alkoxy or phenoxy" it is meant any alkoxy or phenoxy substituent which will be readily hydrolyzed when the vinyl-functional silane is added to the colloidal silica as described above and which will not impart undesirable haze to the cured abrasion resistant layer. Lower alkoxy groups, such as methoxy, ethoxy, and propyloxy, come within this definition, with methoxy being preferred.

The following vinyl-functional silanes satisfy the above formula: vinyltris(2-methoxyethoxy)silane, vinyltriethoxysilane, vinyltriisopropenoxysilane, phenylvinyldiethoxysilane, vinyltris(t-butylperoxy)silane, vinylmethyldiethoxysilane, vinyltris-t-butoxysilane, vinyldimethylethoxysilane, vinyltriphenoxysilane, diphenylvinylethoxysilane, vinyltrimethoxysilane, 1,3-divinyltetraethoxydisiloxane, and vinyltriisopropoxysilane.

The preferred vinyl-functional silanes include vinyltriethoxysilane, vinyltrimethoxysilane and vinyltris(2-methoxyethoxy)silane, with vinyltrimethoxysilane being most preferred.

The radiation curable coating composition may be applied to the synthetic film by any convenient method, including spray coating, gravure coating, and slot coating techniques.

In general, the radiation curable coating is at least about 1 micron thick. Desirably, it is at least about 5 microns thick and is preferably about 6 to about 10 microns thick.

The solvent should be substantially removed from the surface of the coated synthetic film prior to curing the vinyl-functional organopolysiloxane. Solvent removal may be accomplished by drying the coated film at temperatures ranging from 75° to 150° C. for a time sufficient to evaporate the water or water/lower aliphatic alkanol solvent system.

The dried radiation curable coating may be conveniently cured by electron beam or ultraviolet irradiation. Ultraviolet irradiation is preferred.

The abrasion resistant synthetic film of the present invention has particular utility in the field of multilayer automotive windshields. While various laminates and constructions are known, such windshields typically comprise at least one layer of polyvinylbutyral sandwiched between two sheets of glass. More recently, U.S. Pat. No. 4,242,403 disclosed bonding a second layer of polyvinylbutyral to the exposed surface of the "inside" glass sheet and overlaying the second polyvinylbutyral layer with an abrasion resistant synthetic film. The abrasion resistant film comprises polyester which has a fully cured, silica reinforced methylsiloxane coating on its exposed surface. The disclosure of U.S. Pat. No. 4,242,403 is hereby incorporated by referenced in its entirety.

EXAMPLES

The following Examples are intended to more fully illustrate the practice and advantages of the present invention. In no event should the specific embodiments recited hereinbelow be construed as explicit or implicit limitations on the generic invention described above.

EXAMPLE I

Preparation of the Silica/Vinyl-Functional Silane Dispersion and the Radiation Curable Coating 48.0 grams of vinyltrimethoxysilane are added dropwise at room temperature to 72 grams of Nalco 1034A, a commercially available acidic colloidal silica, with gentle stirring using a magnetic stirrer. The mixture was stirred for 4 hours at room temperature in a closed container and was then heated to 60° C. in a water bath for 30 minutes while still being stirred.

4.8 grams of SARTOMER C-9035, a water-soluble, highly ethoxylated trimethylolpropane triacrylate commercially available from ARCO Specialty Chemicals, was mixed with 4.0 grams of isopropanol, 0.9 grams of IRGACURE 500, a photoinitiator commercially available from Ciba-Geigy, and 0.2 grams of a fluorinated surfactant commercially available from 3M under the trademark FC-430. The resulting mixture was added to 12 grams of the silica/vinyltrimethoxysilane condensate to form the radiation curable coating composition.

The coating composition was applied, using a #18 Meyer rod, to 4 mil thick, acrylic-primed polyester film, commercially available from Hoechst Celanese Corporation under the trademark HOSTAPHAN® 4500. The coating was first dried in an oven maintained at 75° C. for one minute and then crosslinked by UV irradiation by passing the coated polyester film four times through a RPC Equipment Co. Model QC 1202 processor at 25 feet/minute using two 200 watt/inch lamps.

EXAMPLE II

Comparison of Abrasion Resistance

The abrasion resistance of transparent films is typically evaluated by means of the Taber test, the Princeton abrasion test, the duPont abrasion test, or variants thereof. The Taber test (ASTM D 1044: "Resistance of Transparent Plastic Materials to Surface Abrasion") uses a Taber abrader (or its equivalent) loaded at 500 grams with CS-10F wheels and rotated against the surface of the film sample for a specified number of cycles. The visual appearance of the sample is then measured as percent changes in haze according to ASTM D 1003: "Measurement of Haze and Luminance Transmittance of Transparent Plastics."

The abrasion-resistant polyester film prepared according to Example I was compared against both the acrylic primed polyester substrate (Control "A") and uncoated, unprimed polyester film (Control "B") using a Taber Research Model Abrasion tester employing a 500 gram load and CS-10F abrasion wheels for 500 cycles. The optical haze of the film samples is measured before and immediately after the sample is abraded. Optical haze is measured using a Gardner hazemeter. Delta Δ haze, having units in percent, was calculated from the difference in percent haze before and after abrasion. Table I gives the percent haze and percent Δ haze values for the abrasion-resistant film of Example I and the Control films "A" and "B". Each value is an average of five readings.

TABLE I

| Sample | Haze Before Abrasion | Haze After Abrasion | ΔHaze |
|---|---|---|---|
| Film of Ex. I | 0.39% | 3.23% | 2.84% |
| Control A | 0.63% | 59.0% | 58.4% |
| Control B | 0.53% | 60.4% | 59.9% |

EXAMPLE III

Comparison of Vinyltrimethoxysilane with Methyltrimethoxysilane-Based Abrasion Resistant Coatings Using the procedure of Examples I and II, six coating compositions were prepared to evaluate the relative abrasion resistance of vinyltrimethoxysilane and methyltrimethoxysilane based coating compositions. The silica/partial condensate compositions are shown in Table II.

TABLE II

| | Condensate | | | | | |
|---|---|---|---|---|---|---|
| Component | A | B | C | D | E | F |
| Colloidal Silica | 36.0 g | 36.0 g | 36.0 g | 36.0 g | 36.0 g | 36.0 g |
| Vinyltrimethoxysilane | 24.0 g | 19.2 g | 14.4 g | 9.6 g | 4.8 g | 0 g |
| Methyltrimethoxysilane | 0 g | 4.8 g | 9.6 g | 14.4 g | 19.2 g | 24.0 g |

12 grams of each condensate were individually mixed with 4.8 grams of highly ethoxylated trimethylolpropane triacrylate (SARTOMER C-9035), 0.9 grams of Irgacure 500, 0.2 grams of FC-430 and 4.0 grams of isopropanol to produce six radiation curable coating compositions.

Each coating composition was applied using a #18 meyer rod, to 5 samples of acrylic-primed, 4 mil-thick polyester film commercially available from Hoechst Celanese Corporation under the trademark HOSTAPHAN 4500. The sample coatings were oven dried for one minute at 75° C. and crosslinked by a single pass through a RPC Equipment Co. Model QC 1202 UV processor at 25 feet/minute using two 200 watt/inch lamps under a nitrogen atmosphere (105 psi).

The optical haze of each polyester film sample was measured before and immediately after being subjected to abrasion by means of a Taber Research Model abrader under a 500 gram load, using CS-10F abrasion wheels for 500 cycles. Results for each coating, reported in Table III below, are the average of the five samples for each coating composition.

TABLE III

| Sample | Vinyl/Methyl Ratio | Haze Before Abrasion | Haze After Abrasion | ΔHaze |
|---|---|---|---|---|
| A | 100% vinyltrimethoxysilane | 0.39 | 3.23 | 2.84 |
| B | 80% vinyl/20% methyl | 0.32 | 3.77 | 3.45 |
| C | 60% vinyl/40% methyl | 0.29 | 5.01 | 4.72 |
| D[1] | 40% vinyl/60% methyl | 0.44 | 15.33 | 14.89 |
| E[1] | 20% vinyl/80% methyl | 0.48 | 28.05 | 27.57 |
| F[1] | 100% methyltrimethoxysilane | 0.43 | 41.97 | 41.54 |

[1]The condensates were prepared on a Friday and left to stand over the weekend. Condensates D, E and F gelled during this period. Additional batches of D, E and F were prepared and immediately coated upon the film substrates. The haze measurements reported in Table III above are from the films coated with the second batch for condensates D, E and F.

EXAMPLE IV

Evaluation of Other Vinyl Functional Silanes

In this example, other vinyl functional silanes were substituted for vinyltrimethoxysilane in the radiation curable coating. These silanes were allyltrimethoxysilane, vinyltriacetoxysilane, divinyltetraethoxydisiloxane, and 3-(N-styryl-methyl-2-aminoethylamino)- propyltrimethoxysilane hydrochloride (sold commercially by Dow Corning as Z-6032). A control with vinyltrimethoxysilane was included.

A silica/silane condensate was prepared by slowly adding two parts of silane to three parts of NALCO 1034A, a commercially available acidic colloidal silica, which had been preheated to 60° C. The addition was performed with constant stirring. Following completion of the silane addition, the reaction vessel was sealed and the mixture was stirred for four hours at a temperature of 60° C.

Despite agitation, the condensates made with vinyltriacetoxysilane and with Z-6032 gelled within thirty minutes after the silane was added to the silica.

Radiation curable coating compositions were prepared by the sequential addition, in order of increasing viscosity and with constant agitation, of 19.9 grams of isopropanol, 0.1 grams of FC-171 surfactant, 2.0 grams of IRGACURE 500 photoinitiator, 16.5 grams of highly ethoxylated trimethylolpropane triacrylate (SARTOMER C-9035), and 5.5 grams of dipentaerythritolmonohydroxypentaacrylate (SARTOMER C-9041) to 56 grams of the other silica/silane condensates.

The radiation curable coating compositions so prepared were then applied to handsheets of 4 mil thick, acrylic primed polyester film, commercially available from Hoechst Celanese Corporation under the trademark HOSTAPHAN ® 4400. Application of the coating onto the film surface was achieved by means of a No. 18 Meyer rod. The coated films were first dried in a forced air oven maintained at 75° C. for five minutes. The coating was then crosslinked by UV irradiation by passing the coated polyester films through an RPC QC 1202 UV curing unit at 25 feet/minute under nitrogen using two 200 watt/inch medium pressure mercury vapor lamps.

The abrasion resistance of the cured polyester film samples was evaluated using the general procedure of Example II, with the exception that a Taber Abraser Model 5130 was substituted for the Taber Research Model. The coated polyester film samples were subjected to 100 cycles on the Abraser with the vacuum on the Taber Abraser set at 70% of full power. Abrasion results for the coating compositions are set forth in Table IV below. Each reported value is the average of five samples.

TABLE IV

| Silane | Initial Haze | Final Haze | % d. Haze |
| --- | --- | --- | --- |
| Allytrimethoxysilane | 0.84% | 4.63% | 3.79% |
| Divinyltetraethoxy-disiloxane | 1.12 | 4.22 | 3.10 |
| Vinyltriacetoxysilane | * | * | * |
| Z-6032 | * | * | * |
| Vinyltrimethoxysilane | 0.82 | 2.81 | 1.99 |

*Condensate gelled

EXAMPLE V

Effect of Varying the Ratio of Silane to Silica

Six batches of siloxane condensate were prepared with the amount of vinyltrimethoxysilane being varied as shown in Table V below:

TABLE V

|  | A | B | C | D | E | F |
| --- | --- | --- | --- | --- | --- | --- |
| NALCO 1034A | 65 g | 65 g | 65 g | 65 g | 65 g | 65 g |
| Vinyl silane | 40 | 50 | 60 | 30 | 20 | 10 |

The vinyltrimethoxysilane was added with stirring to the NALCO 1034A colloidal silica, which had been preheated to 60° C. in a water bath. Following the completion of the vinyl silane addition, the reaction vessel was closed and the mixture was stirred for four hours at a temperature of 60° C.

Coatings were prepared with each of the condensates in Table V except that condensate F gelled during the hydrolysis and condensation reaction. The formulation for each of the coatings is shown in Table VI below. The amount of condensate and solvent used were varied to maintain constant the total concentration of active ingredients and the ratio of siloxane to acrylated monomer.

TABLE VI

|  | A | B | C | D | E |
| --- | --- | --- | --- | --- | --- |
| Condensate | 56.0 g | 52.5 g | 49.9 g | 60.9 g | 68.3 g |
| Isopropanol | 14.0 | 15.7 | 17.1 | 11.6 | 7.9 |
| Butanol | 14.0 | 15.7 | 17.1 | 11.6 | 7.9 |
| SARTOMER C-9035 | 16.5 | 16.5 | 16.5 | 16.5 | 16.5 |
| SARTOMER C-9041 | 5.5 | 5.5 | 5.5 | 5.5 | 5.5 |
| IRGACURE 500 | 2.0 | 2.0 | 2.0 | 2.0 | 2.0 |
| FC-171 | 1.0 | 1.0 | 1.0 | 1.0 | 1.0 |

The radiation curable coatings so prepared were then applied to handsheets of 4 mil thick, acrylic primed polyester film, commercially available from Hoechst Celanese Corporation under the trademark HOSTAPHAN ® 4400. Application of the coating onto the film surface was achieved by means of a No. 18 Meyer rod. The coated films were first dried in a forced air oven maintained at 75° C. for five minutes. The coating was then crosslinked by UV irradiation by passing the coated polyester films through an RPC QC 1202 UV curing unit at 25 feet/minute under nitrogen using two 200 watt/inch medium pressure mercury vapor lamps.

The abrasion resistance of the cured polyester film samples was evaluated using the general procedure of Example II, with the exception that a Taber Abraser Model 5130 was substituted for the Taber Research Model. The coated polyester film samples were subjected to 100 cycles on the Abraser with the vacuum on the Taber Abraser set at 70% of full power. Abrasion results for the coating compositions are set forth in Table VII below. Each reported value is the average of five samples.

TABLE VII

| Sample | Initial Haze | Final Haze | % d. Haze |
| --- | --- | --- | --- |
| C | 1.21% | 3.31% | 2.10% |
| B | 0.91 | 2.99 | 2.08 |
| A | 0.88 | 2.46 | 1.58 |
| D | 0.86 | 2.55 | 1.69 |
| E | 0.98 | 2.52 | 1.54 |
| F | * | * | * |

*Condensate gelled

EXAMPLE VI

Effect of Varying the Ratio of Siloxane to Acrylated Monomer

A master batch of silica/vinyltrimethoxysilane siloxane condensate was prepared by slowly adding with stirring two parts of vinyltrimethoxysilane to three parts of NALCO 1034A, a commercially available acidic colloidal silica, which had been preheated in a water bath to 60° C. Following the completion of the silane addition the reaction vessel was closed and the mixture was left to stir for four hours at 60° C.

Several radiation curable coating compositions were prepared from the above condensate. The formulations are shown in Table VIII below. Total concentration of active ingredients was held constant at 54.5% by adjusting the amount of isopropanol.

TABLE VIII

|  | A | B | C | D | E | F |
|---|---|---|---|---|---|---|
| Condensate | 56.0 g | 47.0 g | 31.3 g | 62.7 g | 70.5 g | 75.2 g |
| SARTOMER C-9035 | 16.5 | 20.4 | 27.3 | 13.6 | 10.2 | 8.2 |
| SARTOMER C-9041 | 5.5 | 6.8 | 9.1 | 4.5 | 3.4 | 2.7 |
| Isopropanol | 19.9 | 23.7 | 30.2 | 17.1 | 13.8 | 11.8 |
| IRGACURE 500 | 2.0 | 2.0 | 2.0 | 2.0 | 2.0 | 2.0 |
| FC-171 | 0.1 | 0.1 | 0.1 | 0.1 | 0.1 | 0.1 |
| Siloxane/ acrylate ratio | 1.5 | 1.0 | 0.5 | 2.0 | 3.0 | 4.0 |

The radiation curable coatings so prepared were then applied to handsheets of 4 mil thick, acrylic primed polyester film, commercially available from Hoechst Celanese Corporation under the trademark HOSTAPHAN ® 4400. Application of the coating onto the film surface was achieved by means of a No. 18 Meyer rod. The coated films were first dried in a forced air oven maintained at 75° C. for five minutes. The coating was then crosslinked by UV irradiation by passing the coated polyester films through an RPC QC 1202 UV curing unit at 25 feet/minute under nitrogen using two 200 watt/inch medium pressure mercury vapor lamps.

The abrasion resistance of the cured polyester film samples was evaluated using the general procedure of Example II, with the exception that a Taber Abraser Model 5130 was substituted for the Taber Research Model. The coated polyester film samples were subjected to 100 cycles on the abraser with the vacuum on the Taber Abraser set at 70% of full power. Each reported value is the average of five samples.

The above-described abrasion resistance evaluation performed twice for each sample: one series of samples were evaluated internally, while the second series was tested by an independent third party evaluator:

TABLE IX

| Sample | Siloxane/Acrylate Ratio | Initial Haze | Final Haze | % d. Haze Indep. | % d. Haze Internal |
|---|---|---|---|---|---|
| C | 0.5 | 0.9% | 3.8% | 2.9% | 2.9% |
| B | 1.0 | 0.6 | 3.1 | 2.5 | 3.9 |
| A | 1.5 | 0.6 | 2.7 | 2.1 | 3.0 |
| D | 2.0 | 0.7 | 2.9 | 2.2 | 2.6 |
| E | 3.0 | 0.7 | 2.9 | 2.2 | 4.8 |
| F | 4.0 | 0.8 | 2.9 | 2.1 | 2.3 |

EXAMPLE VII

Preparation of A Vinyltrimethoxysilane/Silica Dispersion

A master silica/vinyl-functional silane dispersion was prepared by slowly adding with stirring two parts of vinyltrimethoxysilane to 3 parts of NALCO 1034A, a commercially available acidic colloidal silica, which had been pre-heated in a water bath to 60° C. Following the completion of the vinyltrimethoxysilane addition the reaction vessel is sealed and the mixture is stirred for four hours at a temperature of 60° C.

EXAMPLE VIII

Evaluation of Multifunctional Acrylates

This Example evaluates various multifunctional acrylates for utility in the Applicants' radiation curable coating composition. Several coating compositions were prepared by sequential addition, in order of increasing viscosity and with constant agitation, of 19 parts isopropanol, 1 part FC-171 surfactant, 22 parts of multifunctional acrylate, and 2 parts of photoinitiator (IRGACURE 500) to 56 parts of the master silica/-vinyltrimethoxysilane dispersion prepared in Example VIII.

The radiation curable coating compositions so prepared were then each applied to handsheets of 4 mil thick, acrylic primed polyester film, commercially available from Hoechst Celanese Corporation under the trademark HOSTAPHAN ® 4400. Application was by means of a No. 18 Meyer rod. The coated films were first dried in a forced air oven maintained at 75° C. for five minutes. The coating compositions were then each crosslinked by UV radiation by passing the coated polyester films through a RPC QC 1202 UV curing unit at 120 feet/minute under nitrogen using two medium pressure mercury vapor lamps.

The abrasion resistance of the cured polyester film samples was evaluated using the general procedure of Example II, with the exception that a Taber Abraser Model 5130 was substituted for the Taber Research model. The polyester film samples were subjected to 100 cycles with the vacuum on the Taber Abraser set at 70 percent of maximum evacuation. Abrasion results for the nine coating compositions are set forth in Table X below. Each reported value is the average of five samples.

TABLE X

| SAMPLE | Multifunctional Acrylate | Haze Before Abrasion | Haze After Abrasion | ΔHaze |
|---|---|---|---|---|
| A | SARTOMER C-9012 | 3.36% | 4.21% | 0.85% |
| B | trimethylolpropane triacrylate | 1.84% | 4.45% | 2.61% |
| C | pentaerythritol triacrylate | 2.14% | 3.59% | 1.04% |
| D | ethoxylated trimethylolpropane-triacrylate (SARTOMER SR-454) | 1.55% | 2.76% | 1.21% |
| E | di-trimethylolpropane triacrylate | 1.75% | 3.01% | 1.27% |
| F | 83/17 blend of SARTOMER C-9012/ diethyleneglycol diacrylate | 1.60% | 2.29% | 1.19% |

TABLE X-continued

| SAMPLE | Multifunctional Acrylate | Haze Before Abrasion | Haze After Abrasion | ΔHaze |
|---|---|---|---|---|
| G | 83.3/17.6 blend of SARTOMER C-9012/ polypropyleneglycol monomethacrylate | 1.78% | 2.98% | 1.20% |
| H | 83.3/17.6 blend of SARTOMER C-9012/ hydroxyethylacrylate | 1.33% | 3.73% | 2.40% |
| I | 83.3/16.7 blend of SARTOMER C-9012/ highly ethoxylated trimethylolpropane triacrylate (SARTOMER C-9035) | 2.06% | 3.26% | 1.20% |

EXAMPLE IX

Preparation and Evaluation of a Preferred Embodiment

A silica/vinyltrimethoxysilane dispersion was prepared as illustrated by Example VIII. A radiation curable composition was formulated by the sequential addition, in order of increasing viscosity and with constant agitation, of 19 parts isopropanol, 1 part FC-171 surfactant, 2 parts of a photoinitiator (IRGACURE 500), and 22 parts of a multifunctional acrylate blend comprising 15 parts of highly ethoxylated trimethylolpropane triacrylate (SARTOMER C-9035) and 7 parts of dipentaerythritolmonohydroxypentacrylate (SARTOMER C-9041).

The above described coating composition was applied to polyethylene terephthalate film samples, and their abrasion resistance evaluated by means of the Taber Abraser as illustrated in Example IX. The initial haze was 0.32%, the final haze was 1.92% and the Δ haze was 1.60%.

I claim:

1. A radiation curable composition comprising:
   (a) from 50 to 85 percent, based on the total weight of the composition, of colloidal silica and the partial condensate of a silane, such that at least sixty percent of the silane is a vinyl-functional silane conforming to the formula

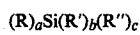

wherein
   R is allyl or vinyl-functional alkyl
   R' is hydrolyzable alkoxy or phenoxy
   R" is non-hydrolyzable, saturated alkyl, phenyl, or siloxy such that $a+b+c=4$; and
   $a \geq 1$;
   $b \geq 1$;
   $c \geq 0$,
   (b) from 15 to 50 percent, based on the total weight of the composition, of one or more multifunctional acrylate or methacrylate monomers.

2. The composition of claim 1 further comprising up to 10 percent of a photoinitiator.

3. The composition of claim 1 wherein said vinyl silane is selected from the group consisting of vinyltris(2-methoxyethoxy)silane, vinyltriethoxysilane, vinyltriisopropenoxysilane, phenylvinyldiethoxysilane, vinyltris(t-butylperoxy)silane, vinyl-methyldiethoxysilane, vinyltris-t-butoxysilane, vinyldimethylethoxysilane, vinyltriphenoxysilane, diphenylvinylethoxysilane, vinyltrimethoxysilane, 1,3-divinyltetraethoxydisiloxane, and vinyltriisopropoxysilane.

4. The composition of claim 3 wherein said vinyl silane is selected from the group consisting of vinyltriethoxysilane, vinyltrimethoxysilane, and vinyltris(2-methoxyethoxy)silane.

5. The composition of claim 4 wherein said vinyl silane is vinyltrimethoxysilane.

6. The composition of claim 2 wherein said photoinitiator is a blend of benzophenone and 1-hydroxycyclohexylphenylketone.

7. The composition of claim 1 further comprising from 1 to 35 weight percent, based upon the total weight of the composition, of at least one water soluble alkanol.

8. The composition of claim 7 wherein said water soluble alkanol comprises isopropanol in an amount ranging from 15 to 25 weight percent, based on the total weight of the composition.

* * * * *